United States Patent
Moraru et al.

(10) Patent No.: US 8,883,907 B2
(45) Date of Patent: Nov. 11, 2014

(54) AQUEOUS DISPERSION

(71) Applicant: BASF SE, Ludwigshafen (DE)

(72) Inventors: Bogdan Moraru, Charlotte, NC (US); Kristin Schmidt, Bad Salzungen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/758,281

(22) Filed: Feb. 4, 2013

(65) Prior Publication Data

US 2013/0203926 A1 Aug. 8, 2013

Related U.S. Application Data

(60) Provisional application No. 61/596,266, filed on Feb. 8, 2012.

(51) Int. Cl.
- *C04B 28/02* (2006.01)
- *C04B 24/26* (2006.01)
- *C08L 25/14* (2006.01)
- *C08K 3/34* (2006.01)
- *C04B 40/00* (2006.01)
- *C04B 111/10* (2006.01)
- *C04B 111/00* (2006.01)
- *C04B 103/00* (2006.01)

(52) U.S. Cl.
CPC . *C08L 25/14* (2013.01); *C08K 3/34* (2013.01); *C04B 2111/1037* (2013.01); *C04B 40/0042* (2013.01); *C04B 2111/00637* (2013.01); *C04B 2103/0065* (2013.01); *C04B 40/0039* (2013.01); *C04B 28/02* (2013.01)

USPC .............. 524/456; 524/2; 524/154; 524/147; 524/556

(58) Field of Classification Search
CPC .... C04B 24/26; C04B 28/02; C04B 40/0042; C04B 40/0039; C04B 14/043; C08L 61/28; C08L 25/14; C08K 5/51; C08K 3/34
USPC ............................ 524/2, 154, 147, 556, 456
See application file for complete search history.

(56) References Cited

U.S. PATENT DOCUMENTS

| | | | |
|---|---|---|---|
| 4,269,749 A | 5/1981 | Marriott et al. | |
| 2011/0054081 A1* | 3/2011 | Dierschke et al. | ........ 524/2 |
| 2012/0270970 A1 | 10/2012 | Bichler et al. | |
| 2013/0005861 A1 | 1/2013 | Dierschke et al. | |
| 2013/0035423 A1 | 2/2013 | Sabio et al. | |

FOREIGN PATENT DOCUMENTS

| | | |
|---|---|---|
| WO | WO 2010/026155 A1 | 3/2010 |
| WO | WO 2011/026720 A1 | 3/2011 |
| WO | WO 2011/026723 A1 | 3/2011 |
| WO | WO 2011/131904 A1 | 10/2011 |
| WO | WO 2012/143205 A1 | 10/2012 |

OTHER PUBLICATIONS

International Search Report and Written Opinion issued Jun. 27, 2013 in PCT/EP2013/051734 with English translation of categories of cited documents.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

Cement-free aqueous polymer dispersion comprising calcium silicate hydrate.

23 Claims, No Drawings

AQUEOUS DISPERSION

The present invention provides a cement-free aqueous dispersion comprising in dispersed form particles of a polymer P and particles of a calcium silicate hydrate, where the polymer P has a number-average particle diameter ≥10 and ≤1000 nm and a glass transition temperature in the range ≥−55 and ≤30° C. and is composed in copolymerized form of 0.1% and ≤10% by weight of at least one hydroxyalkyl acrylate, hydroxyalkyl methacrylate and/or an amide of an α,β-monoethylenically unsaturated $C_3$ to $C_6$ monocarboxylic or $C_4$ to $C_6$ dicarboxylic acid (monomers A), ≥0% and ≤0.5% by weight of at least one α,β-monoethylenically unsaturated $C_3$ to $C_6$ monocarboxylic or $C_4$ to $C_6$ dicarboxylic acid (monomers B), ≥0% and ≤10% by weight of methyl methacrylate (monomer C), and ≥90% and ≤99.9% by weight of at least one further ethylenically unsaturated monomer which is different from the monomers A to C (monomers D), the amounts of the monomers A to D adding up to 100% by weight, and where the calcium silicate hydrate has a weight-average particle diameter ≥0.1 and ≤100 nm.

The present invention further provides a process for preparing the aforementioned cement-free aqueous dispersion, the use of the cement-free aqueous dispersion as an additive in hydraulically setting compositions, and hydraulically setting corn positions comprising the abovementioned cement-free aqueous dispersion.

Hydraulically setting compositions for the purposes of the present invention are inorganic binders in powder form which comprise in general, as aggregates, sands, gravels, crushed rocks or other fillers, such as natural or synthetic fibers, for example, and which are converted by stirring with water into their ready-to-use form, known as mortars or concretes, which, when left to themselves, in the air or else, in some cases, under water, undergo stonelike solidification as a function of time. Compositions of this kind which set hydraulically, such as burnt lime or gypsum and also, in particular, cements (in this regard see EN 197-1), such as Portland cements, white cements, Thurament, Celitement, and also cements admixed for example with slag sand, flyash, silica dust, metakaolin, natural pozzolans or burnt oil shale, are familiar to the skilled person.

In order to improve the mechanical properties of the mortars and concretes to be processed, and/or of the solidified or set materials obtained from them (examples being flexural tensile strength, substrate adhesion, flexibility), the mortars and concretes are admixed with finely divided polymers (number-average particle diameter ≥10 and ≤1000 nm) in the form of aqueous polydispersions or of the polymer powders obtainable from these dispersions. A disadvantage of these finely divided polymers is that they generally exhibit a retardant effect on the setting behavior (i.e., stonelike solidification) of the mortars and concretes.

Especially in the case of mortars or concretes based on cementitious systems, however, rapid setting and a high "early strength" are necessary, and for this reason compounds known as accelerators, such as calcium formate, calcium chloride or lithium carbonate, for example, are admixed to the concrete or mortar mixtures. A problematic feature of the stated known accelerators is that they have disadvantages, in respect, for example, of corrosion resistance of steel-reinforced concretes or development of efflorescence. A further disadvantage is the relatively large amount in which the known accelerators are used.

In order to obtain an even more rapid setting behavior and even higher early strengths in conjunction with constant ultimate strengths for concrete or mortar mixtures, in tandem, moreover, with ingredient quantities that are reduced still further, dispersions of finely divided calcium silicate hydrates are presently in use. Such dispersions of finely divided calcium silicate hydrates, and their preparation, are disclosed for example in WO 2010/26155, WO 2011/26720, and WO 2011/26723 and also in the Euro-PCT application, the priority date of which is not earlier than that of the present specification, said application being based on the European priority application with the application number 11163464.8. A disadvantage of these dispersions of finely divided calcium silicate hydrates is that they tend toward agglomeration on storage, and their accelerating effect in the setting of the mortars and concretes subsides or is even lost completely. In order to reduce or prevent entirely the agglomeration of the aqueous dispersions of the finely divided calcium silicate hydrates, it is necessary for stabilizers and/or plasticizers to be admixed to the aqueous dispersions of finely divided calcium silicate hydrates. The aqueous dispersions of finely divided calcium silicate hydrates that are prepared and/or stabilized in this way are admixed as a separate component to the concrete or mortar mixtures.

If the skilled person wishes to combine the abovementioned advantages of the finely divided polymers with the accelerating effect of the finely divided calcium silicate hydrates, he or she is forced to use them or admix them in the form of two separate components during mortar or concrete production. The skilled person, however, prefers "specific one-pot systems" on account of their greater ease of storage (one instead of two storage tanks) and handling (especially quantity measurement and metering).

Our own investigations have shown, however, that the mixtures of common aqueous dispersions of polymers having a number-average particle diameter ≥10 and ≤1000 nm and a glass transition temperature in the range ≥−55 and ≤30° C. with calcium silicate hydrates having a weight-average particle diameter ≥0.1 and ≤100 nm did not have a sufficient shelf life, owing to gelling, coagulation or viscosity increase. Furthermore, such mixtures lose their accelerating effect in the curing of the mortars and concretes.

It was an object of the present invention, therefore, to provide cement-free aqueous dispersions comprising in dispersed form polymers having a number-average particle diameter ≥10 and ≤1000 nm and a glass transition temperature in the range ≥−55 and ≤30° C. and calcium silicate hydrates having a weight-average particle diameter ≥0.1 and ≤100 nm, which have a shelf life ≥28 days at 23° C.

The object is achieved by the cement-free aqueous dispersions defined at the outset.

Essential to the invention is the use of an aqueous dispersion of a polymer P which has a number-average particle diameter ≥10 and ≤1000 nm and a glass transition temperature in the range ≥−55 and ≤30° C. and is composed in copolymerized form of ≥0.1% and ≤10% by weight of at least one monomer A,
≥0% and ≤0.5% by weight of at least one monomer B,
≥0% and ≤10% by weight of monomer C, and
≥90% and ≤99.9% by weight of at least one monomer D,
and with particular advantage is composed of
≥2.0% and ≤8.0% by weight of at least one monomer A,
≥0% and ≤0.2% by weight of at least one monomer B,
≥0% and ≤2.0% by weight of monomer C, and
≥92% and ≤98% by weight of at least one monomer D,
the amounts of the monomers A to D adding up in each case to 100% by weight (total monomer amount).

As monomers A it is possible in principle to use all hydroxyalkyl, advantageously hydroxy-$C_2$-$C_{10}$ alkyl, preferably hydroxy-$C_2$-$C_4$ alkyl, and with particular advantage hydroxy-$C_2$-$C_3$ alkyl acrylates and/or methacrylates, where in the context of this specification the alkoxylated hydroxyalkyl acrylates and/or methacrylates, i.e., those reacted with alkylene oxides (essentially ethylene oxide and propylene oxide), are also regarded as being monomers A. The at least one monomer A is with advantage selected from the group encompassing diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate, and 2-hydroxyethyl methacrylate. With particular advantage use is made of 2-hydroxyethyl acrylate, 2-hydroxyethyl methacrylate, 2-hydroxypropyl acrylate, 2-hydroxypropyl methacrylate, 3-hydroxypropyl acrylate and/or 3-hydroxypropyl methacrylate, with 2-hydroxyethyl acrylate and/or 2-hydroxyethyl methacrylate being particularly preferred.

Likewise contemplated as monomers A are all $\alpha,\beta$-monoethylenically unsaturated $C_3$ to $C_6$ monocarboxamides or $C_4$ to $C_6$ dicarboxamides. Likewise included among the monomers A are the aforementioned compounds whose carboxamide group is substituted by an alkyl group or by a methylol group. Examples of such monomers A are the amides and diamides, respectively, of the $\alpha,\beta$-monoethylenically unsaturated $C_3$ to $C_6$, preferably $C_3$ or $C_4$, monocarboxylic or $C_4$ to $C_6$ dicarboxylic acids, such as, for example, acrylamide, methacrylamide, ethylacrylamide, itaconic monoamide or diamide, allylacetamide, crotonamide, vinylacetamide, fumaric monoamide or diamide, maleic monoamide or diamide, and 2-methylmaleic monoamide or diamide. Examples of $\alpha,\beta$-monoethylenically unsaturated $C_3$ to $C_6$ monocarboxamides or $C_4$ to $C_6$ dicarboxamides whose carboxamide groups are substituted by an alkyl group or by a methylol group are N-alkylacrylamides and -methacrylamides, such as, for example, N-tert butylacrylamide and -methacrylamide, N-methylacrylamide and -methacrylamide, and N-methylolacrylamide and N-methylolmethacrylamide. Preferred amidic monomers A are acrylamide and/or methacrylamide.

Particularly preferred as monomers A, therefore, are 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, acrylamide and/or methacrylamide.

The polymer P used in accordance with the invention comprises $\geq 0.1\%$ and $\leq 10\%$ by weight, preferably $\geq 2.0\%$ and $\leq 8.0\%$ by weight, and with more particular preference $\geq 3.0\%$ and $\leq 6.0\%$ by weight of monomers A in copolymerized form.

Monomers B contemplated are $\alpha,\beta$-nnonoethylenically unsaturated $C_3$ to $C_6$, preferably $C_3$ or $C_4$, monocarboxylic or $C_4$ to $C_6$ dicarboxylic acids such as, for example, acrylic acid, methacrylic acid, ethylacrylic acid, itaconic acid, allylacetic acid, crotonic acid, vinylacetic acid, fumaric acid, maleic acid, and 2-methylmaleic acid. The monomers B also, however, comprise the anhydrides of corresponding $\alpha,\beta$-monoethylenically unsaturated dicarboxylic acids, such as, for example, maleic anhydride or 2-methylmaleic anhydride. The monomer B containing acid groups is preferably selected from the group encompassing acrylic acid, methacrylic acid, crotonic acid, fumaric acid, maleic acid, maleic anhydride, 2-methylmaleic acid, and itaconic acid, with acrylic acid, methacrylic acid and/or itaconic acid being particularly preferred. It will be appreciated that the monomers B also encompass the fully or partly neutralized, water-soluble salts, more particularly the alkali metal salts or ammonium salts, of the aforementioned acids.

The polymer P used in accordance with the invention comprises $\geq 0\%$ and $\leq 0.5\%$ by weight, preferably $\geq 0\%$ and $\leq 0.2\%$ by weight, and with more particular preference none at all, of monomers B in copolymerized form.

Methyl methacrylate exclusively is used as monomer C.

The polymer P used in accordance with the invention comprises $\geq 0\%$ and $\leq 10\%$ by weight, preferably $\geq 0\%$ and $\leq 2.0\%$ by weight, and with more particular preference $\geq 0\%$ and $\leq 0.5\%$ by weight of monomer C in copolymerized form.

Contemplated as monomers D are all ethylenically unsaturated compounds which differ from the monomers A to C but are copolymerizable with them. Suitable monomers D are, for example, those ethylenically unsaturated monomers whose homopolymers have a glass transition temperature $Tg \leq 30°$ C., such as, for example, conjugated aliphatic $C_4$ to $C_9$ diene compounds, esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate and methacrylate, $C_1$ to $C_{10}$ dialkyl maleate and/or $C_1$ to $C_{10}$ dialkyl fumarate, vinyl ethers of $C_3$ to $C_{10}$ alkanols, branched and unbranched $C_3$ to $C_{10}$ olefins. It is advantageous to use those monomers D whose homopolymers have a glass transition temperature $Tg < 0°$ C. Used with particular advantage as monomers D are vinyl acetate, ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate, di-n-butyl maleate, di-n-butyl fumarate, with 2-ethylhexyl acrylate, n-butyl acrylate, 1,4-butadiene and/or ethyl acrylate being especially preferred.

$C_1$ to $C_{10}$ alkyl groups are to be taken in the context of this specification to mean linear or branched alkyl radicals having 1 to 10 carbon atoms, as for example methyl, ethyl, n-propyl, isopropyl, n-butyl, sec-butyl, isobutyl, tert-butyl, n-pentyl, isopentyl, tert-pentyl n-hexyl, 2-ethylhexyl, n-nonyl or n-decyl. $C_5$ to $C_{10}$ cycloalkyl groups are preferably cyclopentyl or cyclohexyl groups, which may optionally be substituted by 1, 2 or 3 $C_1$ to $C_4$ alkyl groups.

Monomers D, however, also include all ethylenically unsaturated monomers whose homopolymers have a glass transition temperature $Tg \geq 50°$ C. and which differ from the monomers A to C. Examples of suitable monomers D are vinylaromatic monomers, $C_2$ to $C_4$ alkyl methacrylates, and ethylenically unsaturated nitrile compounds. Vinylaromatic monomers are understood to include in particular derivatives of styrene or of $\alpha$-methylstyrene in which the phenyl rings are substituted optionally by 1, 2 or 3 $C_1$ to $C_4$ alkyl groups, halogen, more particularly bromine or chlorine, and/or methoxy groups. The ethylenically unsaturated nitrile compounds are essentially the nitriles which derive from the aforementioned $\alpha,\beta$-monoethylenically unsaturated, especially $C_3$ to $C_6$, preferably $C_3$ or $C_4$, monocarboxylic or dicarboxylic acids, such as, for example, acrylonitrile, methacrylonitrile, maleonitrile and/or fumaronitrile, with acrylonitrile and/or methacrylonitrile being particularly preferred. Particularly preferred such monomers are styrene, $\alpha$-methylstyrene, o- or p-vinyltoluene, p-acetoxystyrene, p-bromostyrene, p-tert-butylstyrene, o-, m- or p-chlorostyrene, tert-butyl acrylate, tert-butyl methacrylate, ethyl methacrylate, isobutyl methacrylate, n-hexyl acrylate, cyclohexyl methacrylate, acrylonitrile, methacrylonitrile, but also, for example, tert-butyl vinyl ether or cyclohexyl vinyl ether, but with styrene and/or tert-butyl methacrylate being especially preferred.

Monomers D contemplated are also those compounds which have at least two nonconjugated ethylenically unsaturated groups. Examples of such are monomers containing two vinyl radicals, monomers containing two vinylidene radicals, and monomers containing two alkenyl radicals. Particularly advantageous in this context are the diesters of dihydric alcohols with α,β-monoethylenically unsaturated monocarboxylic acids, among which acrylic acid and methacrylic acid are preferred. Examples of such monomers containing two non-conjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with α,β-monoethylenically unsaturated monocarboxylic acids, such as, for example, glycerol triacrylate, glycerol trimethacrylate, trimethylolpropane triacrylate, trimethylolpropane trimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Especially preferred are 1,4-butylene glycol diacrylate, allyl methacrylate and/or divinylbenzene. The proportion of these crosslinking monomers is advantageously ≤5% by weight, preferably ≤2% by weight, and with more advantage ≤1% by weight, based in each case on the total amount of monomers D.

With advantage, the monomers D consist to an extent of ≥90% by weight, preferably ≥95% by weight, and, with more particular preference, ≥98% by weight of n-butyl acrylate, 2-ethylhexyl acrylate, ethyl acrylate and/or 1,4-butadiene or of mixtures of these monomers with styrene.

It is essential, however, that the polymer P have a glass transition temperature Tg in the range of ≥−55 and ≤30° C., advantageously in the range −35 and ≤15° C., and with more particular advantage in the range ≥−20 and ≤5° C. If the cement-free aqueous dispersions of the invention are to be used in flexible mineral grouts, then the polymers P are selected such that their glass transition temperature Tg is in the range of ≥−40 and ≤10° C., advantageously in the range ≥−20 and ≤5° C., and with more particular advantage in the range ≥−15 and ≤0° C. If, alternatively, the cement-free aqueous dispersions of the invention are to be used in repair mortars, then the polymers P are selected such that their glass transition temperature Tg is in the range of ≥−15 and ≤20° C., advantageously in the range ≥−5 and ≤20° C., and with more particular advantage in the range ≥0 and ≤15° C. The polymers P used in accordance with the invention therefore comprise the monomers A to D in copolymerized form in the type and amount such that they have the aforementioned glass transition temperatures Tg.

According to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980) the glass transition temperature of copolymers with no more than low levels of crosslinking is given in good approximation by:

$$1/Tg = x1/Tg1 + x2/Tg2 + \ldots xn/Tgn,$$

where $x1, x2, \ldots xn$ are the mass fractions of the monomers $1, 2, \ldots n$ and $Tg1, Tg2, \ldots Tgn$ are the glass transition temperatures of the polymers formed in each case only from one of the monomers $1, 2, \ldots n$, in degrees Kelvin. The glass transition temperatures of these homopolymers of the majority of ethylenically unsaturated monomers are known (or can be determined experimentally in a simple manner known per se) and are listed for example in J. Brandrup, E. H. Immergut, Polymer Handbook 1st ed., J. Wiley, New York, 1966, 2nd ed., J. Wiley, New York, 1975, and 3rd ed., J. Wiley, New York, 1989, and also in Ullmann's Encyclopedia of Industrial Chemistry, page 169, Verlag Chemie, Weinheim, 1992.

In the context of this specification, the figures for glass transition temperatures, Tg, relate, however, to the glass transition temperatures determined by the DSC method (Differential Scanning calorimetry, 20 K/min, midpoint measurement, DIN 53765) by means of a DSC 822 instrument (series TA 8000) from Mettler-Toledo.

The preparation of the polymers P is familiar in principle to the skilled person and is accomplished, for example, by radical polymerization of the monomers A to D by the method of bulk, emulsion, solution, precipitation or suspension polymerization, but with more particular preference being given to radically initiated aqueous emulsion polymerization. Advantageously in accordance with the invention, therefore, the polymer P is dispersed in an aqueous medium, i.e., is used in the form of an aqueous polymer dispersion.

The implementation of radically initiated emulsion polymerizations of ethylenically unsaturated monomers in an aqueous medium has been described many times before and is therefore sufficiently well known to the skilled person [in this regard cf. Emulsion Polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerization, Interscience Publishers, New York (1965); DE-A 40 03 422; and Dispersionen synthetischer Hochpolymerer, F. Hölscher, Springer-Verlag, Berlin (1969)]. The radically initiated aqueous emulsion polymerization customarily takes place such that the ethylenically unsaturated monomers are dispersed in the aqueous medium, generally with additional use of dispersing assistants, such as emulsifiers and/or protective colloids, and are polymerized by means of at least one water-soluble radical polymerization initiator. In the resultant aqueous polymer dispersions, the residual levels of unreacted ethylenically unsaturated monomers are frequently lowered by chemical and/or physical methods likewise known to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115], the polymer solids content is adjusted to a desired level by dilution or concentration, or other customary adjuvants, such as, for example, bactericides, foam-modifying or viscosity-modifying additives, are added to the aqueous polymer dispersion. The preparation of an aqueous dispersion of the polymer P differs from this general procedure only in the specific use of the aforementioned monomers A to D. It is self-evident here that with regard to the preparation of the polymer P in the context of the present specification, the intention is also that the seed, staged, and gradient regimes familiar to the skilled person are also encompassed.

For preparing the polymers P, used in accordance with the invention, in the form of their aqueous polymer dispersions (aqueous polymer P dispersions) it is possible for the total amount of the monomers A to D (total monomer amount) to be introduced as initial charge to the aqueous reaction medium before the polymerization reaction is initiated. It is also possible, however, to introduce optionally only a portion of the monomers A to D as initial charge to the aqueous reaction medium before the polymerization reaction is initiated, and then, following initiation of the polymerization, under polymerization conditions, during the radical emulsion polymerization, to add the total amount or the optionally remaining amount, in accordance with the rate of consumption, continuously, with consistent or varying volume flow rates, or discontinuously. In that case the metering of the monomers A to D may take place in the form of separate, individual streams, as inhomogeneous or homogeneous (sub-)mixtures or as a monomer emulsion. The monomers A to D are metered advantageously in the form of a monomer mixture, more particularly in the form of an aqueous monomer emulsion.

For preparing the aqueous polymer P dispersions used in accordance with the invention, the assistants used include dispersing assistants, which hold the monomer droplets and the resultant polymer particles in disperse distribution in the aqueous medium and hence ensure the stability of the aqueous polymer dispersions produced. Dispersing assistants contemplated include not only the protective colloids commonly used for implementing radical aqueous emulsion polymerizations but also emulsifiers.

Examples of suitable protective colloids are polyvinyl alcohols, polyalkylene glycols, alkali metal salts of polyacrylic acids and polymethacrylic acids, gelatin derivatives, or acrylic acid, methacrylic acid, maleic anhydride, 2-acrylamido-2-methylpropanesulfonic acid and/or 4-styrenesulfonic acid copolymers and their alkali metal salts, and also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. A detailed description of further suitable protective colloids is found in Houben-Weyl, Methoden der organischen Chemie, vol. XIV/1, Makromolekulare Stoffe [Macromolecular compounds], Georg-Thieme-Verlag, Stuttgart, 1961, pages 411 to 420.

It will be appreciated that mixtures of protective colloids and/or emulsifiers can also be used. Use is frequently made as dispersing assistants exclusively of emulsifiers, whose relative molecular weights, unlike those of the protective colloids, are usually below 1000. They may be anionic, cationic or nonionic in nature. It will be appreciated that, where mixtures of surface-active substances are used, the individual components must be compatible with one another, something which in case of doubt can be ascertained by means of a few preliminary tests. Generally speaking, anionic emulsifiers are compatible with one another and with nonionic emulsifiers. The same is true of cationic emulsifiers, whereas anionic and cationic emulsifiers are normally not compatible with one another. An overview of suitable emulsifiers is found in Houben-Weyl, Methoden der organischen Chemie, vol. XIV/1, Makromolekulare Stoffe [Macromolecular compounds], Georg-Thieme-Verlag, Stuttgart, 1961, pages 192 to 208.

However, particularly emulsifiers are used as dispersing assistants.

Examples of customary nonionic emulsifiers include ethoxylated mono-, di-, and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A grades ($C_{12}C_{14}$ fatty alcohol ethoxylates, EO degree: 3 to 8), Lutensol® AO grades ($C_{13}C_{15}$ oxo-process alcohol ethoxylates, EO degree: 3 to 30), Lutensol® AT grades ($C_{16}C_{18}$ fatty alcohol ethoxylates, EO degree: 11 to 80), Lutensol® ON grades ($C_{10}$ oxo-process alcohol ethoxylates, EO degree: 3 to 11), and Lutensol® TO grades ($C_{13}$ oxo-process alcohol ethoxylates, EO degree: 3 to 20), all from BASF SE.

Examples of customary anionic emulsifiers include alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and with ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$).

Of proven suitability as further anionic emulsifiers are, furthermore, compounds of the general formula (I)

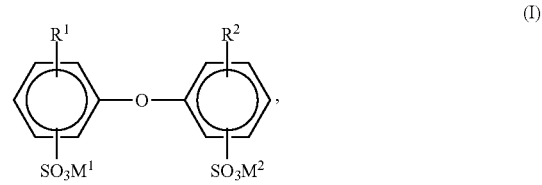

(I)

in which $R^1$ and $R^2$ are H atoms or $C_4$ to $C_{24}$ alkyl and are not simultaneously H atoms, and $M^1$ and $M^2$ can be alkali metal ions and/or ammonium ions. $R^1$ and $R^2$ in the general formula (I) are preferably linear or branched alkyl radicals with 6 to 18 carbon atoms, in particular with 6, 12, and 16 carbon atoms, or hydrogen, $R^1$ and $R^2$ not both simultaneously being H atoms. $M^1$ and $M^2$ are preferably sodium, potassium or ammonium, with sodium being particularly preferred. Particularly advantageous compounds (I) are those in which $M^1$ and $M^2$ are sodium, $R^1$ is a branched alkyl radical with 12 carbon atoms, and $R^2$ is an H atom or $R^1$. Frequently use is made of technical mixtures which contain a fraction of 50% to 90% by weight of the monoalkylated product, such as Dowfax® 2A1 (brand name of the Dow Chemical Company). The compounds (I) are common knowledge, from U.S. Pat. No. 4,269,749 for example, and are available commercially.

Suitable cation-active emulsifiers are in general $C_6$ to $C_{18}$ alkyl-, $C_6$ to $C_{18}$ alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts. Mention may be made by way of example of dodecylammonium acetate or the corresponding sulfate, the sulfates or acetates of the various 2-(N,N,N-trimethylammonium)ethyl paraffin esters, N-cetylpyridinium sulfate, N-laurylpyridinium sulfate, and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and also the gemini surfactant N,N'-(lauryldimethyl)ethylene-diamine disulfate, ethoxylated tallowalkyl-N-methylammonium sulfate, and ethoxylated oleylamine (for example, Uniperol® AC from BASF SE, approximately 11 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. Minimal nucleophilicity in the anionic countergroups is favorable, appropriate examples being perchlorate, sulfate, phosphate, nitrate, and carboxylates, such as acetate, trifluoroacetate, trichloroacetate, propionate, oxalate, citrate, and benzoate, and, also conjugated anions of organic sulfonic acids, such as methylsulfonate, trifluoromethylsulfonate, and para-toluenesulfonate, for example, and additionally tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers used with preference as dispersing assistants are employed advantageously in a total amount of $\geq 0.005\%$ and $\leq 10\%$ by weight, preferably $\geq 0.01\%$ and $\leq 5\%$ by weight, in particular $\geq 0.1\%$ and $\leq 3\%$ by weight, based in each case on the total amount of monomer.

The total amount of protective colloids used in addition to or in place of the emulsifiers as dispersing assistants is often $\geq 0.1\%$ and $\leq 40\%$ and frequently $\geq 0.2\%$ and $\leq 25\%$ by weight, based in each case on the total amount of monomer.

It is preferred, however, to use anionic and/or nonionic emulsifiers as dispersing assistants.

For preparing the polymer P dispersions used in accordance with the invention, the total amount of the dispersing assistant can be introduced as initial charge to the aqueous reaction medium before the polymerization reaction is initiated. It is also possible, however, optionally to introduce only a portion of the dispersing assistant as initial charge to the aqueous reaction medium before the polymerization reaction is initiated, and then to add the total amount or the optionally remaining amount of the dispersing assistant continuously or discontinuously, under polymerization conditions, during the radical emulsion polymerization. The major amount or the total amount of dispersing assistant is preferably added in the form of an aqueous monomer emulsion.

The radically initiated aqueous emulsion polymerization is set off by means of a radical polymerization initiator (free-radical initiator). Such initiators may in principle be peroxides and also azo compounds. It will be appreciated that redox initiator systems are also contemplated. Peroxides used can in principle be inorganic peroxides, such as hydrogen peroxide or peroxodisulfates, such as the mono- or di-alkali metal or -ammonium salts of peroxodisulfuric acid, examples being their mono- and di-sodium, -potassium or -ammonium salts, or organic peroxides, such as alkyl hydroperoxides, examples being tert-butyl, p-menthyl or cumyl hydroperoxide, and also dialkyl or diaryl peroxides, such as di-tert-butyl or dicumyl peroxide.

Azo compounds that find use are substantially 2,2'-azobis(isobutyronitrile), 2,2'-azobis(2,4-dimethylvaleronitrile), and 2,2'-azobis(amidinopropyl)dihydrochloride (AIBA, corresponding to V-50 from Wako Chemicals). Suitable oxidants for redox initiator systems are substantially the abovementioned peroxides. As corresponding reductants it is possible to employ compounds of sulfur in a low oxidation state, such as alkali metal sulfites, examples being potassium and/or sodium sulfite, alkali metal hydrogen sulfites, examples being potassium and/or sodium hydrogen sulfite, alkali metal metabisulfites, examples being potassium and/or sodium metabisulfite, formaldehyde-sulfoxylates, examples being potassium and/or sodium formaldehyde sulfoxylate, alkali metal salts, especially potassium and/or sodium salts, of aliphatic sulfinic acids, and alkali metal hydrogen sulfides, such as potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general the amount of free-radical initiator used, based on the total monomer amount, is 0.01% to 5%, preferably 0.1% to 3%, and more preferably 0.2% to 1.5% by weight.

For preparing the polymer P dispersions used in accordance with the invention, the total amount of the free-radical initiator can be introduced as initial charge to the aqueous reaction medium before the polymerization reaction is initiated. It is possible, however, to introduce, optionally, only a portion of the free-radical initiator as initial charge to the aqueous reaction medium before the polymerization reaction is initiated, and then to add the total amount or the optionally remaining amount continuously or discontinuously, at the rate of consumption, under polymerization conditions, during the radical emulsion polymerization.

The initiation of the polymerization reaction means the start of the polymerization reaction of the monomers present in the polymerization vessel, after the free-radical initiator has formed radicals. This initiation of the polymerization reaction may take place by addition of free-radical initiator to the aqueous polymerization mixture in the polymerization vessel under polymerization conditions. It is, however, also possible for a portion or the total amount of the free-radical initiator to be added to the aqueous polymerization mixture, comprising the monomers initially introduced, in the polymerization vessel under conditions not suitable for setting off a polymerization reaction, such as low temperature, for example, and to subsequently bring about polymerization conditions in the aqueous polymerization mixture. By polymerization conditions here are meant, generally, those temperatures and pressures under which the radically initiated aqueous emulsion polymerization proceeds at a sufficient polymerization rate. They are dependent in particular on the free-radical initiator used. The nature and amount of the free-radical initiator, the polymerization temperature, and the polymerization pressure are advantageously selected such that the free-radical initiator has a half-life <3 hours, with particular advantage <1 hour, and with very particular advantage <30 minutes, while continually providing initiating radicals to a sufficient extent to initiate and maintain the polymerization reaction.

Reaction temperature contemplated for the radically initiated aqueous emulsion polymerization encompasses the whole range from 0 to 170° C. It is usual to employ temperatures of 50 to 120° C., preferably 60 to 110° C., and more preferably 70 to 100° C. The radical aqueous emulsion polymerization can be carried out at a pressure less than, equal to or greater than 1 atm [1.013 bar (absolute), atmospheric pressure], so that the polymerization temperature may exceed 100° C. and may be up to 170° C. In the presence of monomers A to F with a low boiling point, the emulsion polymerization is conducted preferably under increased pressure. This pressure may adopt values of 1.2, 1.5, 2, 5, 10 or 15 bar (absolute) or even higher. Where the emulsion polymerization is carried out at subatmospheric pressure, pressures of 950 mbar, frequently of 900 mbar and often 850 mbar (absolute), are brought about. The radical aqueous emulsion polymerization is carried out advantageously at 1 atm in the absence of oxygen, more particularly under an inert gas atmosphere, such as under nitrogen or argon, for example.

The aqueous reaction medium may in principle also comprise minor amounts (<5% by weight) of water-soluble organic solvents, such as methanol, ethanol, isopropanol, butanols, pentanols, or alternatively acetone, etc. Preferably, the aqueous reaction medium contains no such solvents.

Besides the aforementioned components, radical chain transfer compounds can also be used, optionally, during the emulsion polymerization, in order to control or reduce the molecular weight of the polymers P available through the polymerization. Use in this case is made substantially of aliphatic and/or araliphatic halogen compounds, examples being n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and all further sulfur compounds described in Polymer Handbook 3rd edition, 1989, J. Brandrup and E. H. Immergut, John Wiley & Sons, section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane or vinylcyclohexane, or hydrocarbons with readily abstractable hydrogen atoms, such as toluene, for example. Another possibility, though, is to use mixtures of mutually nondisrupting aforementioned radical chain transfer compounds.

The total amount of radical chain transfer compounds used optionally during the emulsion polymerization, based on the total amount of monomer, is generally ≥5%, often ≤3%, and frequently ≥1%, by weight.

It is advantageous if a portion or the entirety of the optionally employed radical chain transfer compound is supplied to the aqueous reaction medium prior to the initiation of the radical polymerization. Furthermore, a portion or the entirety of the radical chain transfer compound may also be supplied to the aqueous reaction medium advantageously together with the monomers A to D during the polymerization.

With particular advantage the preparation of the aqueous polymer P dispersions takes place such that the monomers A to D are reacted under polymerization conditions through to a conversion of ≥95% by weight, advantageously ≥99% by weight, and with particular advantage ≥99.5% by weight. Determining the monomer conversion is familiar to the skilled person and is accomplished more particularly by reaction-calorimetric and/or spectroscopic methods. Frequently it is advantageous if the aqueous polymer P dispersions obtained after the end of the polymerization are subjected to an aftertreatment for the purpose of reducing the residual monomer content. This aftertreatment takes place either chemically, as for example by completion of the polymerization reaction through the use of a more effective free-radical initiator system (referred to as postpolymerization), and/or physically, as for example by stripping of the aqueous polymer P dispersions with steam or inert gas. Corresponding chemical and/or physical methods are familiar to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115]. The combination of chemical and physical aftertreatment there offers the advantage that not only the unreacted monomers but also other disruptive volatile organic constituents (the so-called VOCs [volatile organic compounds]) are removed from the aqueous polymer P dispersions.

The aqueous polymer P dispersions used in accordance with the invention typically have a polymer solids content of ≥10% and ≤70% by weight, frequently ≥20% and ≤65% by weight, and often ≥25% and ≤60% by weight, based in each case on the aqueous polymer dispersion. The number-average particle diameter (cumulant z-average) determined via quasielastic light scattering (ISO standard 13 321) is situated generally in the range ≥10 and ≤1000 nm, preferably in the range ≥50 and ≤600 nm, and advantageously in the range ≥100 to ≤500 nm.

The aqueous polymer P dispersions advantageously have a pH in the range from ≥6 to ≤8 and with more particular advantage from ≥6.5 to ≤7.5, measured in each case with a calibrated, commercially customary pH meter at 23° C.

Calcium silicate hydrates are known in principle to the skilled person. They are reaction products of the clinker phases $Ca_3SiO_5$ ($C_3S$) and $Ca_2SiO_4$ ($C_2S$), which are formed during the production of cement clinker and are therefore present substantially in cement, with water. The calcium silicate hydrates formed in this reaction are critically responsible for the strength of the resultant cement stone, and, moreover, bind the aggregates that are present in concrete or mortar, such as sand or gravel, for example, or adjuvants, such as natural or synthetic fibers, for example.

The preparation of cement-free, finely divided calcium silicate hydrates in the form of their aqueous suspensions with a weight-average particle diameter ≥0.1 and ≤100 nm is known in principle to the skilled person from the specifications WO 2010/26155, WO 2011/26720, WO 2011/26723 and also from the Euro-PCT application, unpublished at the priority date of the present specification, based on the European priority application with the application number 11163464.8.

The cement-free, finely divided calcium silicate hydrates obtained in accordance with the teaching of the aforementioned specifications can be used in principle for preparing the aqueous dispersions of the invention. It is therefore the intention that the subject matter disclosed in WO 2010/26155, page 2, line 4 to page 67, line 39, in WO 2011/26720, page 2, line 16 to page 66, line 10, and in WO 2011/26723, page 2, line 5 to page 33, line 7, should be considered by virtue of the expressed reference thereto as belonging as a part of this specification.

The calcium silicate hydrates used in accordance with the invention advantageously have the following average composition:

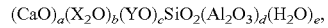

$$(CaO)_a(X_2O)_b(YO)_cSiO_2(Al_2O_3)_d(H_2O)_e,$$

where

X is sodium and/or potassium,

Y is magnesium, strontium and/or barium, and a: stands for a value ≥0.1 and ≤2, b: stands for a value ≥0 and ≤0.5, c: stands for a value ≥0 and ≤2, d: stands for a value ≥0 and ≤1, and e: stands for a value ≥1 and ≤6.

With particular advantage a: stands for a value ≥0.6 and ≤1.8, b: stands for a value ≥0 and ≤0.2, c: stands for a value ≥0 and ≤0.1, d: stands for a value ≥0 and ≤0.1, and e: stands for a value ≥1 and ≤6.

It is essential of the invention that the calcium silicate hydrates have a weight-average particle diameter ≥0.1 and ≤100 nm, advantageously ≥1 and ≤50 nm, and with more particular advantage ≥5 and ≤20 nm. The determination of the weight-average particle diameters is known to the skilled person and is accomplished by the method of the analytical ultracentrifuge. By weight-average particle diameter in this specification is meant the weight-average Dw50 figure as determined by the method of the analytical ultracentrifuge at 25° C. (in this regard, cf. H. Cölfen, "Analytical Ultracentrifugation of Nanoparticles" in Encyclopedia of Nanoscience and Nanotechnology [American Scientific Publishers, 2004], pages 67 to 88).

The calcium silicate hydrate used is preferably foshagite, hillebrandite, xonotlite, Nekoite, clinotobermorite, 9 Å-tobermorite (riversiderite), 11 Å-tobermorite, 14 Å-tobermorite (plombierite), jennite, metajennite, calcium chondrodite, afwillite, $\alpha$-$C_2S.H_2O$, dellaite, jaffeite, rosenhahnite, killalaite and/or suolunite, with particular preference being given to xonotlite, 9 Å-tobermorite (riversiderite), 11 Å-tobermorite, 14 Å-tobermorite (plombierite), jennite, metajennite, afwillite and/or jaffeite.

Suitable with particular preference in accordance with the invention are those calcium silicate hydrates which have been prepared by reaction of sodium metasilicate [$Na_2O.n\,SiO_2$, with n=1 to 4, preferably 1 to 3.4] with calcium nitrate, calcium acetate, calcium hydroxide, calcium sulfate and/or calcium formate in an aqueous medium.

The reactants here are advantageously selected in terms of their nature and amount so as to result in a molar Ca/Si ratio in the calcium silicate hydrate of 1:1 to 1:1.6. With particular advantage, the molar Ca/Si ratio in the calcium silicate hydrate is from 1:1 to 1:1.3.

With particular advantage, calcium silicate hydrates of these kinds are prepared by reacting sodium metasilicate with calcium nitrate, calcium acetate, calcium hydroxide, calcium sulfate and/or calcium formate in the presence of an organic comb polymer dissolved in the aqueous medium. Suitable organic comb polymers are disclosed in WO 2010/26155, page 9, line 34 to page 16, line 49, in WO 2011/26720, page 16, line 5 to page 24, line 4, and in WO 2011/26723, page 19, line 1 to page 26, line 12.

The finely divided calcium silicate hydrates which can be used in accordance with the invention are present advantageously in the form of their aqueous dispersions. The calcium silicate hydrates solids content in such dispersions is generally ≥0.1% and ≤20% by weight, advantageously ≥1% and ≤10% by weight, and with more particular advantage ≥2% and ≤8% by weight, based in each case on the aqueous dispersion of the calcium silicate hydrates. The calcium silicate hydrates solids content is determined arithmetically by evaporating a sample at 60° C., with subsequent thermogravimetric analysis.

The aqueous dispersions of the invention, comprising particles of polymer P and particles of calcium silicate hydrate, are advantageously obtained by mixing the aqueous dispersion of the calcium silicate hydrate and the aqueous dispersion of the polymer P with one another in any desired order, although preferably the aqueous dispersion of the calcium silicate hydrate is added at a temperature ≥5 and ≤40° C. to the aqueous dispersion of the polymer P, and the resulting aqueous dispersion is mixed homogeneously.

The blending generally produces aqueous dispersions whose weight ratio of polymer P to calcium silicate hydrate (calculated in each case as solids) is 1:1 to 90:1, advantageously 5:1 to 75:1, and with more particular advantage 20:1 to 60:1.

It will be appreciated that from the aqueous dispersions of the invention, comprising particles of polymer P and particles of calcium silicate hydrate, it is possible to prepare the corresponding polymer powder compositions by customary drying methods (such as freeze drying or spray drying, for example).

The polymer powder compositions can be prepared with particular advantage by spray drying methods that are familiar to the skilled person, from the aqueous dispersions comprising particles of polymer P and particles of calcium silicate hydrate. For this purpose, in general, the aqueous dispersions are admixed with 0.1% to 30%, frequently 5% to 15%, by weight, based on the sum of the total amounts of polymer P and calcium silicate hydrate, of what are called drying assistants. Such drying assistants are familiar to the skilled person and are disclosed for example in EP-A 812872, page 5, line 20 to page 6, line 17, and also in the prior art indicated therein.

The spray drying of the aqueous dispersion of the invention takes place here generally such that the aqueous dispersion is sprayed in a drying tower with an entry temperature $T_{en}$ of the hot air stream at 100 to 200° C., preferably at 120 to 160° C., and with an exit temperature $T_{ex}$ of the hot air stream of 30 to 90° C., preferably 50 to 90° C. Spraying of the aqueous dispersion in the hot air stream may take place here by means, for example, of single-fluid or multi-fluid nozzles or via a rotating disc. The polymer powder composition is normally deposited using cyclones or filter separators. The sprayed aqueous dispersion and the hot air stream are preferably conveyed in parallel. It is advantageous, during the spray drying operation in the drying tower, to meter in, additionally, a finely divided inorganic antiblocking agent familiar to the skilled person, such as finely divided silica gel, for example, which has the effect in particular of preventing caking of the polymer powder composition particles obtained by spray drying during prolonged storage.

Also encompassed in accordance with the invention, accordingly, are the polymer powder compositions which are formed in a drying operation and comprise particles of polymer P and particles of calcium silicate hydrate.

The aqueous dispersions of the invention and the polymer powder compositions are suitable advantageously as additives to aqueous formulations of hydraulically setting compositions, such as mortars and concretes, especially when cement is the sole hydraulically setting composition. Depending on the project, therefore, it is possible for example for blast furnace cement, oil shell cement, Portland cement, hydrophobized Portland cement, quick-setting cement, swelling cement or alumina cement to be used advantageously as hydraulically setting composition.

Encompassed in accordance with the invention as well, accordingly, are aqueous formulations of hydraulically setting compositions, such as, more particularly, mortars and concretes, which comprise an aqueous dispersion comprising particles of polymer P and particles of calcium silicate hydrate, or comprise a polymer powder composition obtainable therefrom by drying. It will be appreciated that the invention is also intended to encompass aqueous formulations of hydraulically setting compositions in which at least one aqueous polymer P dispersion and at least one aqueous dispersion of a calcium silicate hydrate have been added as separate components.

Relative to the hydraulically setting compositions, more particularly cement (calculated as solids and without aggregates), the sum of the total amounts of polymer P and calcium silicate hydrate (in aqueous dispersion or polymer powder composition, calculated as solids) is in total 10% to 150% by weight and advantageously 80% to 100% by weight.

As a result of the cement-free aqueous dispersions of the invention, comprising in dispersed form particles of a polymer P and particles of a calcium silicate hydrate, and also by virtue of the polymer powder compositions obtainable therefrom by drying, it is possible to have access to additive systems which in aqueous formulations of hydraulically setting compositions, such as, more particularly, mortars and concretes, exhibit advantageous properties, such as, more particularly, more rapid setting and better mechanical properties of the set/cured mortars and concretes, given constant processing properties of the mortars and concretes.

The nonlimiting examples which follow are intended to illustrate the invention.

EXAMPLES

A) Preparation of the Aqueous Dispersion of the Calcium Silicate Hydrate

In a first step, three aqueous solutions were prepared at 20 to 25° C. (room temperature) by dissolving the corresponding salts and polymers, respectively, in deionized water:

Solution 1: 10.7 g of sodium metasilicate ($Na_2SiO_3.5H_2O$) and 30.0 g of deionized water Solution 2: 12.0 g of calcium nitrate tetrahydrate and 11.1 g of deionized water Solution 3: 13.0 g of Glenium® ACE 30 (concrete plasticizer from BASF SE) and 920.3 g of deionized water Subsequently, solution 3 was introduced into a 2 l glass flask and stirred at 300 rpm at room temperature. Metered in continuously to this initial charge, beginning simultaneously, were solutions 1 and 2, with solution 1 being metered at a rate of 69.6 ml per hour and solution 2 at a rate of 31.2 ml per hour. The resulting dispersion was then stirred at room temperature for 30 minutes more. The solids content of the resulting dispersion was 2.4% by weight and the weight-average particle diameter was 15 nm.

The solids content was determined by drying a sample (about 0.5 g) in an aluminum crucible having an internal diameter of about 3 cm at 60° C. to constant weight (about 3 hours).

The weight-average particle diameter was determined by the method of the analytical ultracentrifuge.

B) Preparation of the Aqueous Polymer Dispersions

Polymer Dispersion D

A 4 l glass vessel with anchor stirrer, heating and cooling means, and various feed ports was charged at room temperature with 400.0 g of deionized water and 6.8 g of a polystyrene seed latex (solids content 33% by weight, with a weight-average particle diameter of 28 nm)

and this initial charge was then heated with stirring (140 rpm) to an internal temperature of 90° C. When this temperature was reached, 10% by weight of the initiator solution was added in one portion and the mixture obtained was stirred for 5 minutes. Subsequently, beginning simultaneously, the total amount of the monomer emulsion was metered in over the course of 180 minutes and the remaining amount of the initiator solution was metered in over the course of 195 minutes, these metered feeds taking place continuously, at constant flow rates, and via spatially separate feed ports.

Initiator Solution:
8.4 g of sodium peroxodisulfate
111.6 g of deionized water

Monomer Emulsion:
544.0 g of deionized water
61.5 g a 32% strength by weight aqueous solution of a fatty alcohol polyglycol ether sulfate (Emulphor® FAS 30 from BASF SE)
140.0 g of a 20% strength by weight aqueous solution of a fatty alcohol polyethoxylate (Lutensol® AT 18 from BASF SE)
5.0 g a 15% strength by weight aqueous solution of sodium lauryl sulfate
90.0 g of hydroxyethyl methacrylate
480.0 g of styrene
15.0 g of methyl methacrylate
30.0 g of n-butyl acrylate and
815.0 g of 2-ethyl hexylacrylate The reaction mixture was subsequently left to react at the aforementioned temperature for 15 minutes more, after which the mixture was cooled to 85° C. The reaction mixture was subsequently supplied at this temperature, beginning simultaneously, with 30 g of a 10% strength by weight aqueous solution of tert-butyl hydroperoxide and 34 g of a 13% strength by weight aqueous solution of acetone bisulfate (1:1 adduct of acetone and sodium hydrogensulfite), these feeds taking place over a period of 120 minutes, at continually constant flow rates, and via spatially separate feed ports. Subsequently, the reaction mixture was left to react at the aforementioned temperature for 15 minutes more and then the mixture was cooled to room temperature. After that, the aqueous polymer dispersion obtained was adjusted with a 20% strength by weight aqueous sodium hydroxide solution to a pH of 7.5. The polymer dispersion obtained had a solids fraction of 56.8% by weight, a number-average particle diameter of 230 nm, and a glass transition temperature of –13° C.

The solids contents were determined generally by drying a defined amount of the aqueous polymer dispersion (about 0.8 g) to constant weight at a temperature of 130° C. (about 2 hours) with the aid of the HR73 moisture analyzer from Mettler Toledo. Two measurements were carried out in each case. The value reported in each case represents the average value of these measurements.

The number-average particle diameters of the polymer particles were determined generally by dynamic light scattering on an aqueous polymer dispersion with a concentration of 0.005 to 0.01 percent by weight at 23° C. by means of an Autosizer IIC from Malvern Instruments, UK. The figure reported is the average diameter of the cumulative evaluation (cumulant z average) of the measured autocorrelation function (ISO standard 13321).

For the determination of the glass transition temperature, the aqueous polymer dispersions were generally applied with a film thickness of about 1 mm to a Teflon sheet and the resultant films were dried at 23° C. and 50% relative humidity (standard conditions) for 24 hours. The glass transition temperature was determined generally using a Q 2000 differential scanning calorimeter from TA Instruments. An initial mass of about 8.5 mg of the polymer films obtained was typically used. The heating rate was 20 K per minute. In each case the second heating curve was detected and was evaluated in accordance with the stipulations in ISO standard 11357-2 and -3.

Comparative Dispersion C1

Comparative dispersion C1 was prepared entirely in analogy with the preparation of the polymer dispersion D, except that 30.0 g of acrylic acid were used instead of 15.0 g of methyl methacrylate, and 800.0 g instead of 815.0 g of 2-ethylhexyl acrylate.

The comparative dispersion C1 thus prepared had a solids fraction of 56.4% by weight, a number-average particle diameter of 260 nm, and a glass transition temperature of –12° C.

Comparative Dispersion C2

Comparative dispersion C2 was prepared entirely in analogy with the preparation of the polymer dispersion D, except that 480.0 g of methyl methacrylate were used instead of 480.0 g of styrene and 15.0 g of methyl methacrylate, and 830.0 g instead of 815.0 g of 2-ethylhexyl acrylate.

The comparative dispersion C2 thus prepared had a solids fraction of 56.9% by weight, a number-average particle diameter of 250 nm, and a glass transition temperature of −15° C.

C) Performance Investigations

I) Determination of Shelf Life

The polymer dispersion D and also the comparative dispersions C1 and C2 were diluted with deionized water to a solids content of 56.0% by weight.

500.0 g of the resulting aqueous polymer dispersions were admixed at room temperature and with stirring with 80.0 g of the aqueous calcium silicate hydrate dispersion obtained under A), and the mixture was stirred for a further 2 minutes. The aqueous dispersions obtained in this way are identified below as aqueous dispersions CD, CC1 and CC2. The aqueous dispersions were subsequently stored in a closed vessel at 23° C. Immediately after preparation and also after 4 days and after 28 days of storage, the viscosities of the resultant aqueous dispersions CD, CC1 and CC2 were determined at 23° C. by means of a Brookfield viscometer using spindle SP1 at 20 revolutions per minute (rpm). The viscosity values obtained, in mPa·s, are reported in Table 1 below.

TABLE 1

Viscosities as a function of storage time

| aqueous dispersion | Viscosity [in mPa · s] | | |
|---|---|---|---|
| | after preparation | after after 4 days | 28 days |
| CD | 100 | 110 | 150 |
| CC1 | 150 | 570 | 1120 |
| CC2 | 200 | 256 | 712 |

II) Preparation of Mortar Mixtures

For the determination of the performance properties, mortar mixtures were prepared using the aqueous dispersions D, C1, C2, CD, CC1, and CC2. Prior to being used, all of the aqueous dispersions D, C1, C2, CD, CC1, and CC2 were stored in closed vessels at 23° C. for 7 days.

The mortar mixtures were prepared by preparing in a first step a homogeneous dry mixture consisting of 25% by weight Portland cement Milke CEM I 42,5,
25% by weight silica sand (grain size <0.09 mm),
25% by weight silica sand (grain size 0.08-0.2 mm) and
25% by weight silica sand (grain size 0.2-0.5 mm)
by mixing in a tumble mixer.

The mortar mixtures were subsequently prepared by introducing 50 parts by weight of each of the aqueous dispersions D, C1, C2, CD, CC1, and CC2 into a vessel at room temperature with stirring (500 rpm), adding 80 parts by weight of the abovementioned dry mixture in each case, and continuing to stir the resulting mortar mixtures at 600 rpm for one minute. The mortar mixtures obtained in this procedure are referred to below as mortar mixtures AD, AC1, AC2, ACD, ACC1, and ACC2. Significantly, however, mortar mixtures ACC1 and ACC2 underwent subsequent thickening so rapidly and severely that it was not possible to conduct any performance tests.

a) Testing of Open Time

"Open time" is a time understood by the skilled person to be the time for which a mortar mixture remains plastically deformable and can therefore be used. For the determination of the open time, the freshly prepared concrete mixtures AD, AC1, AC2, and ACD were stirred manually by hand with a spatula every 5 minutes at a temperature of 23° C., and changes in the viscosities were observed. A sharp increase in viscosity marks the end of the open time. The results obtained are summarized in Table 2. A favorable open time is a time of ≥30 minutes.

b) Testing of Through-Cure Time

In order to test the through-cure times, aluminum panels were coated with a self-adhesive Teflon sheet. The freshly prepared mortar mixtures AD, AC1, AC2, and ACD were applied to these sheets with the aid of an applicator with a height of about 2.5 mm. The application and storage of the applied mortar mixtures took place under standard conditions.

Stipulated as the through-cure time was that time after which the mortar mixtures were "walkable" without any visible impressions being left. For this purpose, a 5 kg weight with a planar, circular contact area having a diameter of 12 cm was placed onto the mortar layer every 15 minutes, and a measurement was made of the time after which the weight no longer left any perceptible impression in the mortar layer. The shorter the through-cure time, the quicker that construction can progress.

The results obtained are likewise summarized in Table 2. An advantageous through-cure time is a time <150 minutes.

c) Testing of Tensile Adhesive Strength After 28 Days

The tensile adhesive strengths after 28 days of storage under standard conditions were tested in accordance with DIN EN 14891, version of November 2007.

As a preliminary to the testing of the tensile adhesive strengths, the required concrete plaques were stored under standard conditions for at least 24 hours.

After this, freshly prepared mortar mixtures AD, AC1, AC2, and ACD were applied within the respective open time, with a wet film thickness of about 2.5 mm, to the stored concrete plaques. The concrete plaques thus coated were then stored under standard conditions for 4 hours in each case. After that, the respective, again freshly prepared mortar mixtures AD, AC1, AC2, and ACD were applied a second time to the already coated concrete plaques, with a wet film thickness of about 2.5 mm, and the coated concrete plaques obtained were subsequently stored under standard conditions for 24 hours.

Following storage, a cementitious tile adhesive (e.g., Nanolight from PCI) was applied using a toothed applicator to the hydraulically set mortar mixtures. After an evaporation time of 5 minutes, 4 tiles in each case were arranged at a distance of 20 mm from one another, and each tile was loaded with a weight of 2 kg for 30 seconds. After a further 24 hours of storage under standard conditions, tensile anchors were bonded to the tiles using an epoxy adhesive, and the resultant concrete plaques with the tiles bonded to them were stored under standard conditions for 28 days. Following this storage, the tensile adhesive strengths of the mortar mixtures AD, AC1, AC2, and ACD were determined using an apparatus from Herion. For this purpose, a force increasing at a constant rate of 250 N per second was applied to the tensile anchors until the tiles were pulled off. The tensile adhesive strength is taken to be the force needed to pull the tiles off. The higher the force in $N/mm^2$ at the point at which the tiles were pulled off, the better the tensile adhesive strength. The values, which are again reported in Table 2, represent in each case the average values of the tensile adhesive strengths obtained with the 4 test tiles.

TABLE 2

Results for open time, through-cure time, and tensile adhesive strength

| Mortar mixture | open time [in min] | through-cure time [in min] | tensile adhesive strength after 28 days [in N/mm²] |
|---|---|---|---|
| AD | 35 | 165 | 1.15 |
| AC1 | 40 | 180 | 1.03 |
| AC2 | 30 | 180 | 0.95 |
| ACD | 35 | 90 | 2.02 |
| ACC1 | — | — | — |
| ACC2 | — | — | — |

From the results it is clearly apparent that the inventive mortar mixture ACD in comparison to the noninventive mortar mixture AD, while having the same open time, had a significantly shorter through-cure time and also a significantly increased tensile adhesive strength after 28 days.

The invention claimed is:

1. A cement-free aqueous dispersion comprising in dispersed form particles of a polymer P and particles of a calcium silicate hydrate, where
the polymer P has a number-average particle diameter of from 10 to 1000 nm and a glass transition temperature in the range from −55 to 30° C. and is comprised of monomers (A), (C), (D), and optionally (B) in copolymerized form:
(A) from 0.1% to 10% by weight of at least one of a hydroxyalkyl acrylate, a hydroxyalkyl methacrylate, and an amide of an α,β-monoethylenically unsaturated $C_3$ to $C_6$ monocarboxylic or $C_4$ to $C_6$ dicarboxylic acid;
(B) from 0% to 0.5% by weight of at least one α,β-monoethylenically unsaturated $C_3$ to $C_6$ monocarboxylic or $C_4$ to $C_6$ dicarboxylic acid;
(C) from 0% to 10% by weight of methyl methacrylate; and
(D) from 90% to 99.9% by weight of at least one further ethylenically unsaturated monomer which is different from the monomers A to C, wherein
the amount of the monomers A to D add up to 100% by weight, and
the calcium silicate hydrate has a weight-average particle diameter from 0.1 to 100 nm.

2. The aqueous dispersion according to claim 1, where the calcium silicate hydrate has the following average composition:

$$(CaO)_a(X_2O)_b(YO)_c SiO_2(Al_2O_3)_d(H_2O)_e,$$

where
X is at least one of sodium and potassium,
Y is at least one of magnesium, strontium and barium, and
a: represents a value from 0.1 to 2,
b: represents a value from 0 to 0.5,
c: represents a value from 0 to 2,
d: represents a value from 0 to 1, and
e: stands for represents a value from 1 to 6.

3. The aqueous dispersion according to claim 2, where
a: represents a value from 0.6 to 1.8,
b: represents a value from 0 to 0.2,
c: represents a value from 0 to 0.1,
d: stands for represents a value from 0 to 0.1, and
e: stands for represents a value from 1 to 6.

4. The aqueous dispersion according to claim 1, where the calcium silicate hydrate has been prepared by reacting sodium metasilicate [$Na_2O.n\ SiO_2$, with n=1 to 4] with calcium nitrate, acetate, hydroxide, sulfate, formate, or a combination thereof, in an aqueous medium.

5. The aqueous dispersion according to claim 4, where the molar Ca/Si ratio in the calcium silicate hydrate is 1:1 to 1:1.6.

6. The aqueous dispersion according to claim 4, where the reaction has been carried out in the presence of an organic comb polymer in solution in the aqueous medium.

7. The aqueous dispersion according to claim 1, where the calcium silicate hydrate has a weight-average particle diameter of from 5 to 20 nm.

8. The aqueous dispersion according to claim 1, where the polymer P is comprised of, in copolymerized form:
from 2.0% to 8.0% by weight of at least one monomer A,
from 0% to 0.2% by weight of at least one monomer B,
from 0% to 2.0% by weight of monomer C, and
92% to 98% by weight of at least one monomer D.

9. The aqueous dispersion according to claim 1, where monomer A is at least one monomer selected from the group consisting of 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, acrylamide, and methacrylamide.

10. The aqueous dispersion according to claim 1, wherein at least 90% by weight of monomer D is at least one member selected from the group consisting of n-butyl acrylate, 2-ethylhexyl acrylate, ethyl acrylate, 1,4-butadiene, and a mixture of styrene with at least one of n-butyl acrylate, 2-ethylhexyl acrylate, ethyl acrylate, and 1,4-butadiene.

11. The aqueous dispersion according to claim 1, where the polymer P has a number-average particle diameter of from 100 to 500 nm.

12. The aqueous dispersion according to claim 1, where the polymer P has a glass transition temperature of from −35 to 15° C.

13. The aqueous dispersion according to claim 1, where the weight ratio of polymer P to calcium silicate hydrate, calculated as solids, is 1:1 to 90:1.

14. The aqueous dispersion according to claim 1, where the polymer P is present in the form of an aqueous polymer dispersion.

15. The aqueous dispersion according to claim 1, where the calcium silicate hydrate is present in the form of an aqueous dispersion.

16. A process for preparing an aqueous dispersion according to claim 14, comprising:
adding an aqueous dispersion of calcium silicate hydrate to the aqueous dispersion of polymer P to form an aqueous heterogeneous dispersion, and
mixing the aqueous heterogeneous dispersion to form a homogenous aqueous dispersion comprising said calcium silicate hydrate and said polymer P, wherein
said adding is carried out at a temperature of from 5 to 40° C.

17. A process for preparing a polymer powder composition,
comprising drying an aqueous dispersion according to claim 1.

18. The process according to claim 17, wherein said drying is spray drying.

19. A polymer powder composition obtained by a process according to claim 17.

20. An aqueous formulation of hydraulically setting compositions, comprising an aqueous dispersion according to claim 1.

21. A hydraulically setting composition in powder form, comprising a polymer powder composition according to claim 19.

22. The aqueous dispersion according to claim 1, wherein polymer P is comprised of monomers (A), (C), (D), and optionally (B) in copolymerized form:
- (A) from 0.1% to 10% by weight of at least one of a hydroxyalkyl acrylate, a hydroxyalkyl methacrylate, and an amide of an α,β-monoethylenically unsaturated $C_3$ to $C_6$ monocarboxylic or $C_4$ to $C_6$ dicarboxylic acid;
- (B) from 0% to 0.5% by weight of at least one α,β-monoethylenically unsaturated $C_3$ to $C_6$ monocarboxylic or $C_4$ to $C_6$ dicarboxylic acid;
- (C) from greater than 0% to 10% by weight of methyl methacrylate; and
- (D) from 90% to 99.9% by weight of at least one further ethylenically unsaturated monomer which is different from the monomers A to C.

23. The aqueous dispersion according to claim 1, wherein polymer P does not contain units of (B) an α,β-monoethylenically unsaturated $C_3$ to $C_6$ monocarboxylic or $C_4$ to $C_6$ dicarboxylic acid.

* * * * *